(12) United States Patent
Scott et al.

(10) Patent No.: US 11,483,956 B2
(45) Date of Patent: Nov. 1, 2022

(54) AGRICULTURAL TRACTOR WITH COMBINED SUPPORT FOR HITCH AND ANTI-ROLL SYSTEMS

(71) Applicant: CNH Industrial America LLC, New Holland, PA (US)

(72) Inventors: Shane M. Scott, Bolingbrook, IL (US); Lucas Koch, St. Louis Park, MN (US); Lorenzo Gomez, Schiller Park, IL (US); Rajeshwar Adupala, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 346 days.

(21) Appl. No.: 16/678,345

(22) Filed: Nov. 8, 2019

(65) Prior Publication Data
US 2020/0146198 A1 May 14, 2020

Related U.S. Application Data

(60) Provisional application No. 62/758,538, filed on Nov. 10, 2018.

(51) Int. Cl.
| | | |
|---|---|---|
| *A01B 59/06* | (2006.01) | |
| *B62D 49/06* | (2006.01) | |
| *B62D 49/08* | (2006.01) | |
| *B60D 1/46* | (2006.01) | |

(52) U.S. Cl.
CPC ............ *A01B 59/066* (2013.01); *B60D 1/465* (2013.01); *B62D 49/065* (2013.01); *B62D 49/08* (2013.01)

(58) Field of Classification Search
CPC .... A01B 59/066; B60D 1/465; B62D 49/065; B62D 49/08
See application file for complete search history.

(56) References Cited

U.S. PATENT DOCUMENTS

| | | | | |
|---|---|---|---|---|
| 2,971,589 | A * | 2/1961 | Du Shane | A01B 63/1117 172/239 |
| 3,399,733 | A * | 9/1968 | North | A01B 63/1117 172/9 |
| 3,779,208 | A * | 12/1973 | Gay | A01D 87/127 414/24.6 |
| 4,519,623 | A * | 5/1985 | Orthman | A01B 59/068 172/439 |

(Continued)

FOREIGN PATENT DOCUMENTS

| | | | | |
|---|---|---|---|---|
| EP | 3300556 A1 | * | 4/2018 | ........... A01B 63/118 |
| GB | 2046062 A | * | 11/1980 | ............. A01B 63/04 |

*Primary Examiner* — Tara Mayo-Pinnock
(74) *Attorney, Agent, or Firm* — Rickard DeMille; Rebecca Henkel

(57) ABSTRACT

A work vehicle includes: a chassis; a cab comprising a frame carried by the chassis; a support structure carried by the chassis; a hitch system directly coupled to the support structure and including a pair of lift arms, each of the lift arms being pivotably coupled to the support structure; and an anti-roll system including an anti-roll bar coupled to the frame of the cab and directly coupled to the support structure such that the support structure simultaneously supports both the hitch system and the anti-roll system. A combined hitch and anti-roll system that includes the support structure, hitch system, and anti-roll system and may be removably mounted to a vehicle is also disclosed.

12 Claims, 3 Drawing Sheets

(56) References Cited

U.S. PATENT DOCUMENTS

| | | | | |
|---|---|---|---|---|
| 5,601,146 | A * | 2/1997 | Schlegel et al. | A01B 59/068 172/439 |
| 6,044,915 | A * | 4/2000 | Schlegel et al. | A01B 59/002 172/439 |
| 6,089,328 | A * | 7/2000 | Moore et al. | A01B 59/068 172/439 |
| 6,352,123 | B1 * | 3/2002 | Schlegel et al. | A01B 59/008 172/439 |
| 6,371,217 | B1 * | 4/2002 | Boden | A01B 59/041 172/439 |
| 6,591,918 | B1 * | 7/2003 | Wojewodzki et al. | A01B 59/041 172/450 |
| 6,830,110 | B2 * | 12/2004 | Schlesser et al. | A01B 63/1006 172/8 |
| 7,673,699 | B2 * | 3/2010 | Mickelson et al. | A01B 59/041 172/450 |
| 7,686,097 | B2 * | 3/2010 | Mozingo et al. | A01B 59/041 172/450 |
| 7,784,558 | B2 * | 8/2010 | Mozingo | A01B 59/066 172/272 |
| 2006/0096766 | A1 * | 5/2006 | Warlick | A01B 59/041 172/450 |
| 2007/0044981 | A1 * | 3/2007 | Mickelson et al. | A01B 59/041 172/450 |
| 2007/0209810 | A1 * | 9/2007 | Mozingo et al. | A01B 63/118 172/450 |
| 2009/0272550 | A1 * | 11/2009 | Mozingo | A01B 59/066 172/1 |

* cited by examiner

AGRICULTURAL TRACTOR WITH COMBINED SUPPORT FOR HITCH AND ANTI-ROLL SYSTEMS

CROSS REFERENCE TO RELATED APPLICATIONS

This application claims the benefit of U.S. Provisional Patent Application No. 62/758,538, entitled "AGRICULTURAL TRACTOR WITH COMBINED SUPPORT FOR HITCH AND ANTI-ROLL SYSTEMS" and filed Nov. 10, 2018, the contents of which are incorporated herein by reference.

BACKGROUND OF THE INVENTION

The present invention relates to work vehicles, and, more particularly, to work vehicles that include hitch systems and anti-roll systems.

Work vehicles, such as agricultural tractors, are often used to pull various agricultural implements that are necessary for tilling, seedbed preparation, planting, mowing, raking, harvesting, baling, spraying, and fertilizing. The agricultural implement may be adapted to be attached to a three point hitch of an agricultural tractor, so that it can be raised and lowered to engage the ground. Three point hitches are useful to both draw and lift an agricultural implement.

Often, work vehicles are equipped with anti-roll systems to reduce body roll of a cab of the work vehicle and the associated the risk of the work vehicle rolling over during, for example, cornering maneuvers. Anti-roll systems generally include an anti-roll bar connected to two links. The links are each connected to a frame of the cab. Due to the safety function of the anti-roll system, it is imperative that the anti-roll bar is adequately supported. Adequately supporting the anti-roll bar can add significant amounts of weight and cost to the work vehicle.

What is needed in the art is a work vehicle with one or more adequately supported anti-roll bars that addresses some of the previously described issues with known work vehicles.

SUMMARY OF THE INVENTION

Exemplary embodiments formed in accordance with the present disclosure provide work vehicles with a support structure that supports both a hitch system and an anti-roll system of the work vehicle.

In some exemplary embodiments provided in accordance with the present disclosure, a combined hitch and anti-roll system for a work vehicle includes: a support structure configured for removably mounting to the work vehicle; a hitch system directly coupled to the support structure and including a pair of lift arms, each of the lift arms being pivotably coupled to the support structure; and an anti-roll system including an anti-roll bar directly coupled to the support structure such that the support structure simultaneously supports both the hitch system and the anti-roll system.

In some exemplary embodiments provided in accordance with the present disclosure, a work vehicle includes: a chassis; a cab comprising a frame carried by the chassis; a support structure carried by the chassis; a hitch system directly coupled to the support structure and including a pair of lift arms, each of the lift arms being pivotably coupled to the support structure; and an anti-roll system including an anti-roll bar coupled to the frame of the cab and directly coupled to the support structure such that the support structure simultaneously supports both the hitch system and the anti-roll system.

A possible advantage of exemplary embodiments provided in accordance with the present disclosure is that the support structure supporting both the hitch system and the anti-roll system can reduce the weight and cost compared to supporting each system using separate supports.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
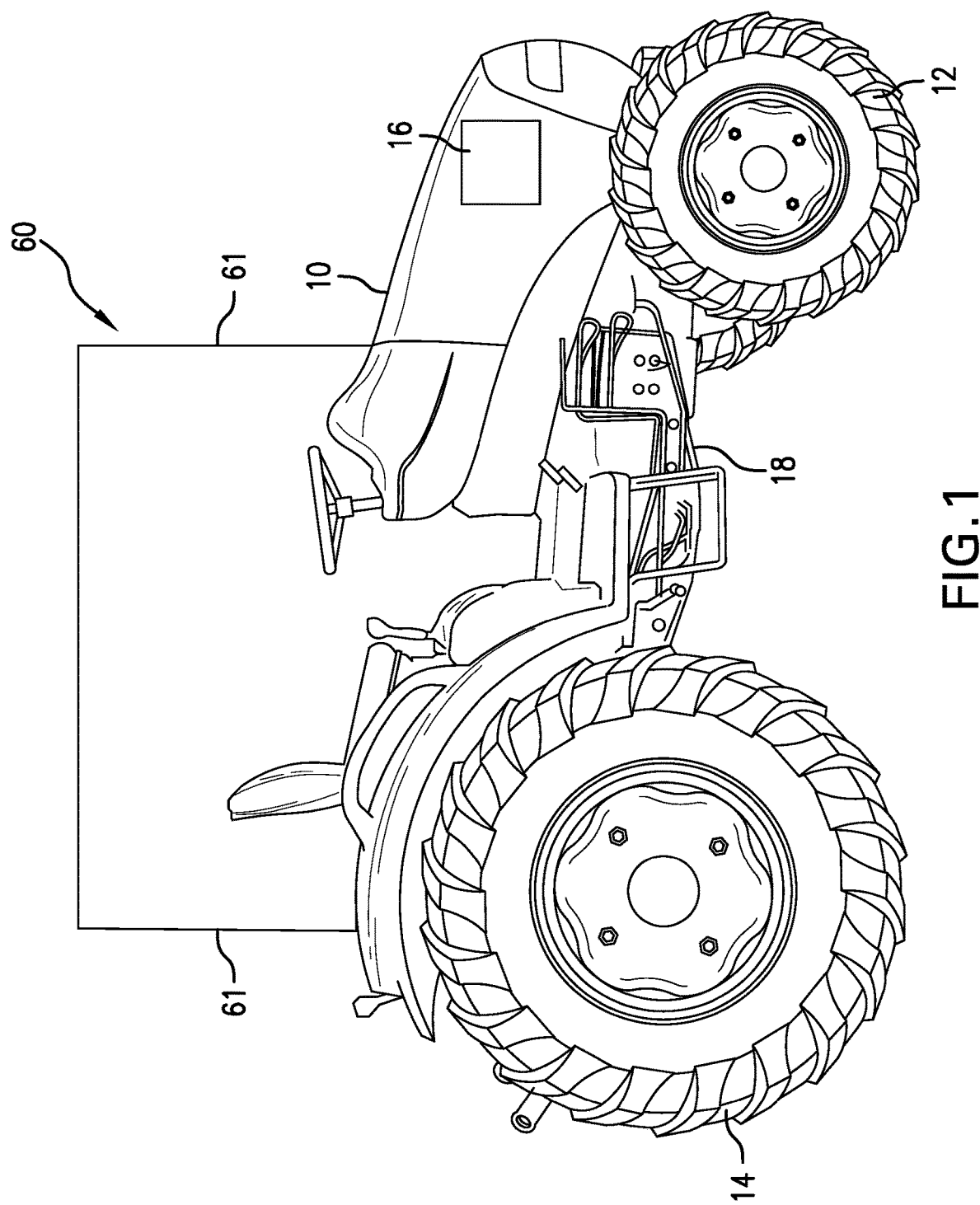
FIG. 1 is a side view of an exemplary embodiment of a work vehicle, illustrated in the form of a tractor, formed in accordance with the present disclosure.
Figure 2:
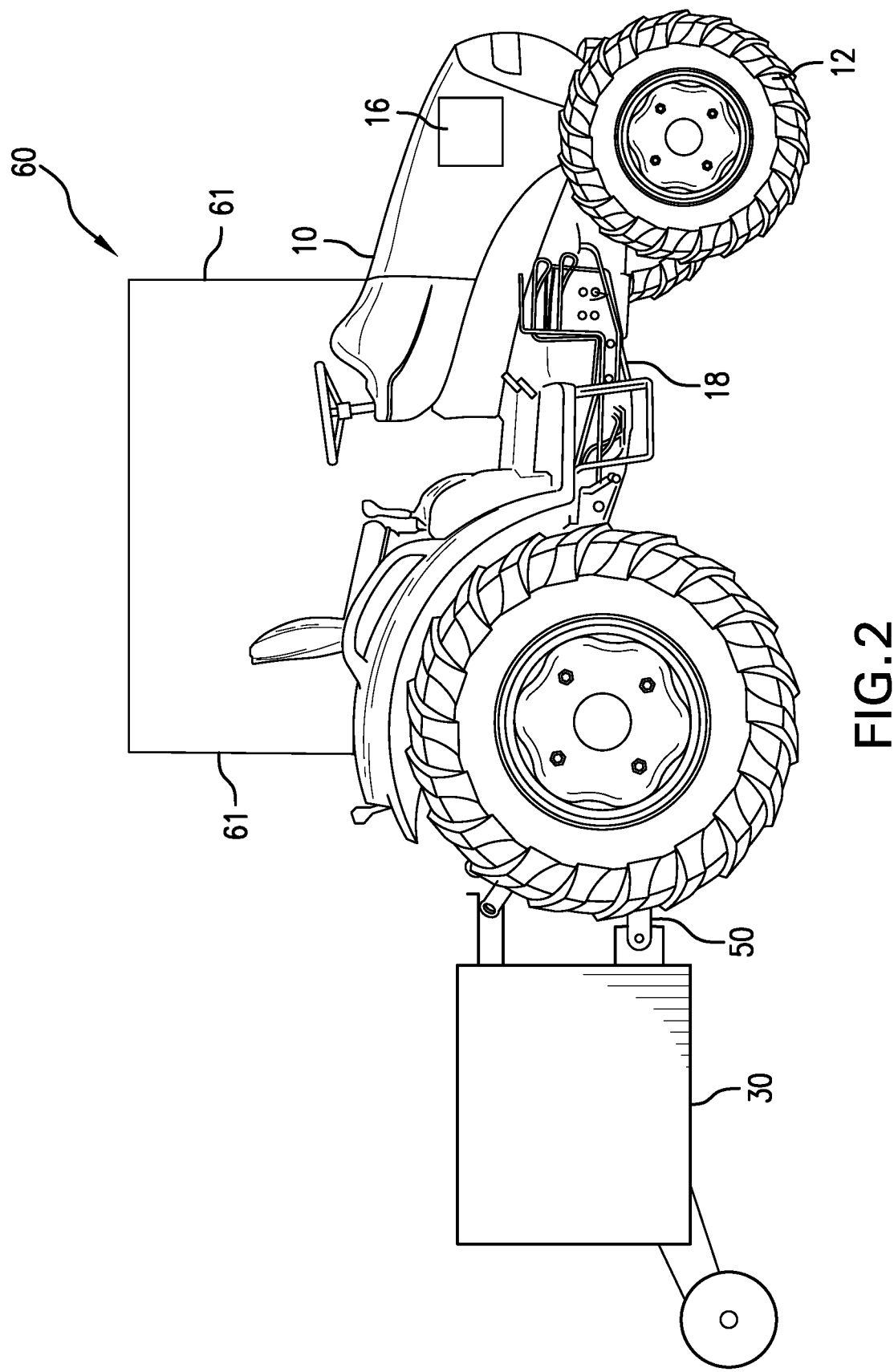
FIG. 2 is a side view of the tractor illustrated in FIG. 1 with an implement coupled to a hitch system of the tractor.

Referring now to the drawings, and more particularly to FIGS. 1-2, there is shown an exemplary embodiment of a work vehicle, illustrated as an agricultural tractor 10, formed in accordance with the present disclosure. It should be appreciated that the illustration and description of the work vehicle 10 as a tractor is exemplary only, and other types of work vehicles, such as agricultural harvesters or dozers, may be formed in accordance with the present disclosure. The tractor 10 includes a pair of front wheels 12, a pair of rear wheels 14, an engine 16, and a chassis 18 carrying the wheels 12, 14 and the engine 16. The agricultural tractor 10 provides tractive effort through the rear wheels 14 and possibly through the front wheels 12 using power supplied by the engine 16. An agricultural implement 30 may be connected to a hitch system 50 of the tractor 10, which is largely obscured by the rear wheels 14 of the tractor 10 in FIGS. 1-2 but illustrated in greater detail in FIG. 3. The tractor 10 also includes a cab 60, which may also be referred to as an "operator cab," having a frame 61 that is carried by the chassis 18. The cab 60 provides an area for an operator to sit and control various functions of the tractor 10 during operation, as is known. The frame 61 may be carried by the chassis 18 in any suitable manner, as is known, so further description of the connection between the frame 61 of the cab 60 and the chassis 18 is omitted for brevity.

Figure 3:
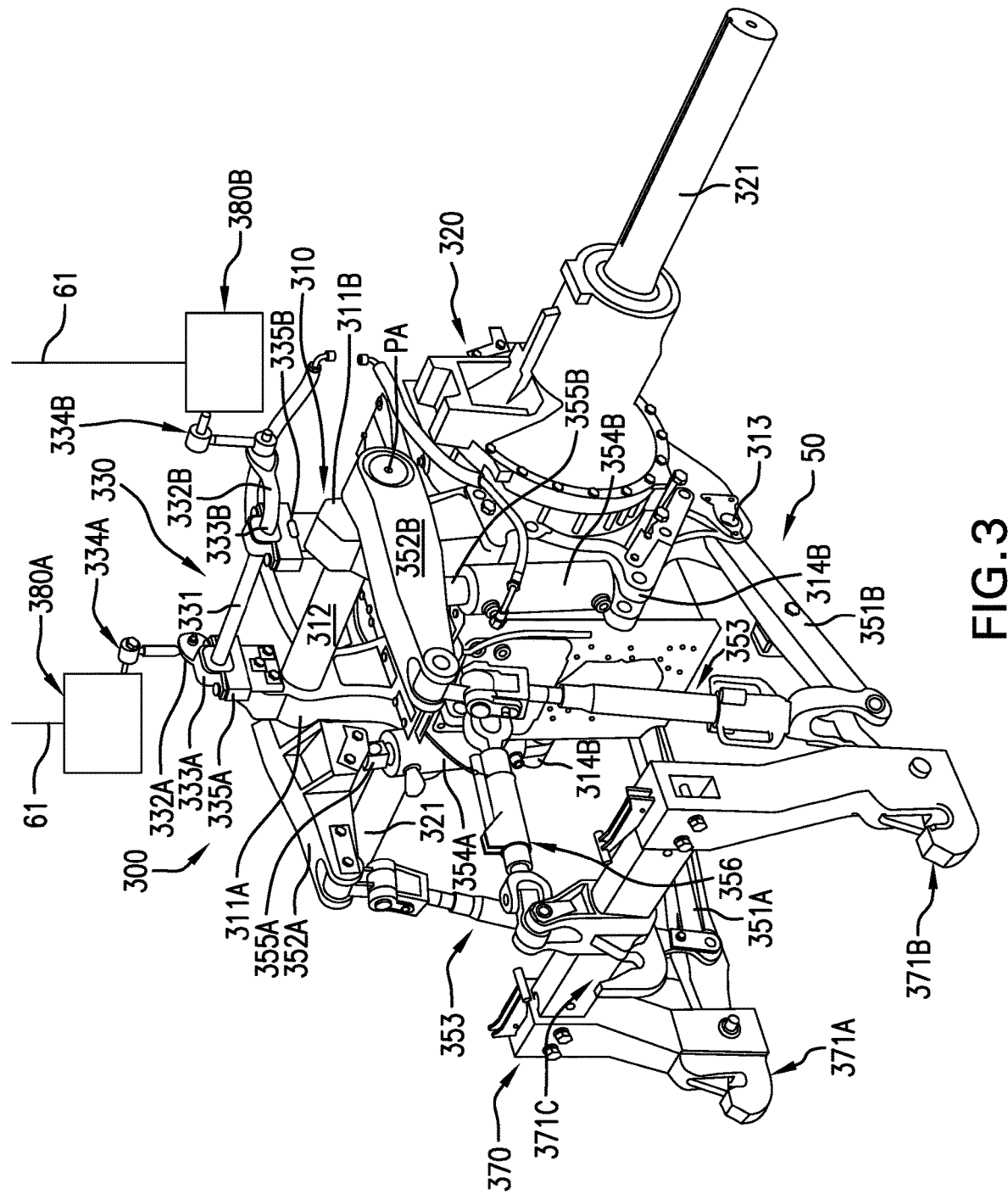
FIG. 3 is a perspective view of an exemplary embodiment of a combined hitch and anti-roll system formed in accordance with the present disclosure and included in the tractor illustrated in FIGS. 1-2.

Referring now to FIG. 3, an exemplary embodiment of a combined hitch and anti-roll system 300 that is carried by the chassis 18 and includes a support structure 310 that simultaneously supports both the hitch system 50 and an anti-roll system 330 is illustrated. In some embodiments, the combined system 300 is configured for removably mounting to the work vehicle 10. For instance, the combined system 300 may be configured to mount to a differential 320, illustrated as a rear differential of the tractor 10, that is rotatably coupled to rear axles 321 that rotate the rear wheels 14. In some embodiments, the support structure 310 includes a pair of spaced apart supports 311A, 311B that are each mounted to the differential 320 and coupled together by a bar 312 disposed in a space between the supports 311A, 311B. It should be appreciated that, in some embodiments, the supports 311A, 311B may be integrally formed with an element of the tractor 10, such as the differential 320, rather than removably mounted. The supports 311A, 311B may each be formed of a relatively rigid material such as, for example, cast iron or steel to provide adequate support for the hitch system 50 and the anti-roll system 330. It should be appreciated that the supports 311A, 311B may each be formed to have any suitable geometry for supporting the hitch system 50 and the anti-roll system 330, and the illustrated geometry in FIG. 3 is exemplary only.

The hitch system 50 is directly coupled to the support structure 310 for support. The hitch system 50 includes a pair of lift arms 351A, 351B that are both pivotably coupled to the support structure 310 to raise and lower a coupled implement, such as the implement 30 illustrated in FIG. 2. Each of the lift arms 351A, 351B may be pivotably coupled to a respective one of the supports 311A, 311B. For example, each lift arm 351A, 351B may be pivotably coupled to a respective arm mounting portion 313 of each support 311A, 311B. In this respect, each lift arm 351A, 351B may be pivoted with respect to the support structure 310 to raise or lower a connected implement. The supports 311A, 311B each support a respective lift arm 351A, 351B during pivoting of the lift arms 351A, 351B and also support the weight of the connected implement 30.

In some embodiments, the tractor 10 includes a pair of rocker arms 352A, 352B that are each connected to a respective lift arm 351A, 351B by a side link 353. Each rocker arm 352A, 352B may be connected to a respective cylinder 354A, 354B. Each of the cylinders 354A, 354B may be connected to a respective support 311A, 311B at a cylinder mounting portion 314A, 314B. The cylinders 354A, 354B may be, for example, fluid cylinders that connect to a hydraulic system of the tractor 10. Extension or retraction of a cylinder rod 355A, 355B of the cylinders 354A, 354B can raise or lower the respectively connected lift arm 351A, 351B via raising or lowering of the respectively connected rocker arm 352A, 352B. The rocker arms 352A, 352B may be coupled to the bar 312 so the bar 312 defines a pivot axis PA of the rocker arms 352A, 352B.

In some embodiments, such as the illustrated embodiment, the hitch system 50 is a three-point hitch system that also includes a top link 356 that is pivotably coupled to the support structure 310. In some embodiments, the top link 356 and lift arms 351A, 351B may each be connected to an easy-mount system 370 with a plurality of hooks 371A, 371B, 371C for coupling to an implement, such as the implement 30. Once the implement 30 is coupled to the lift arms 351A, 351B and the top link 356, using the easy-mount system 370 or not, pivoting of the lift arms 351A, 351B relative to the support structure 310 can raise and lower the coupled implement 30 to, for example, prepare the implement 30 for towing by the tractor 10.

The anti-roll system 330 includes an anti-roll bar 331 that is coupled to the frame 61 of the cab 60 and is directly coupled to the support structure 310. As is known, the anti-roll bar 331 acts as a torsion bar to control body roll of the cab 60. The stiffness of the anti-roll bar 331 may be adjusted by, for example, adjusting material properties of the anti-roll bar 331 to provide the desired stiffness. The anti-roll bar 331 may be coupled to the frame 61 by, for example, coupling to connecting portions 380A, 380B of the frame 61. The connecting portions 380A, 380B are illustrated generically as rectangular boxes in FIG. 3, since many suitable connecting configurations are known, and it should be appreciated that the connecting portions 380A, 380B of the frame 61 may be configured in any suitable manner for coupling the anti-roll bar 331 to the frame 61 of the cab 60. The anti-roll bar 331 may include a lever arm 332A, 332B at each end 333A, 333B of the anti-roll bar 331. The lever arms 332A, 332B each couple to a respective connecting portion 380A, 380B of the frame 61 via a respective anti-roll link 334A, 334B, thus coupling the anti-roll bar 331 to the frame 61. The anti-roll bar 331 may directly couple to the support structure 310 via, for example, a pair of anti-roll brackets 335A, 335B that are each connected to a respective support 311A, 311B. In some embodiments, the anti-roll brackets 335A, 335B each connect to a respective support 311A, 311B in the space between the supports 311A, 311B. In this respect, the anti-roll system 330 may also be supported by the support structure 310 simultaneously with the hitch system 50.

In known work vehicles, the hitch system and the anti-roll system are generally supported by separate support structures. While this is effective to adequately support both systems, having separate support structures generally increases the weight of the work vehicle due to, for example, mounting hardware for both of the support structures. Having separate support structures also increases the cost of the vehicle because there are more parts, which requires more labor to produce the vehicle.

Work vehicles formed in accordance with the present disclosure, on the other hand, support both the hitch system 50 and the anti-roll system 330 using a common support structure 310. Using a common support structure 310 can reduce the weight of the work vehicle 10, since only one set of mounting hardware is needed, and also reduce cost because fewer parts are needed. Further, the hitch system 50 generally requires a higher degree of rigidity for adequate support than the anti-roll system 330. Configuring the support structure 310 to have sufficient rigidity to adequately support the hitch system 50 also provides more than enough rigidity to adequately support the anti-roll system 330, which increases the performance of the anti-roll system 330. Even further, the hitch system 50 and the anti-roll system 330 may be coupled to the support structure 310 prior to installation on the vehicle 10, forming a combined hitch and anti-roll system 300. The support structure 310 of the combined system 300 may then be mounted to the vehicle 10, such as to the differential 320, which can simplify installation. Thus, the support structure 310 supporting both the hitch system 50 and the anti-roll system 330 can reduce the weight, complexity, and cost of supporting both the hitch system 50 and the anti-roll system 330 compared to supporting each of the systems 50, 330 with a separate support structure.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A combined hitch and anti-roll system for a work vehicle, comprising:
   a support structure configured for removably mounting to the work vehicle, the support structure comprising a pair of spaced apart supports coupled to one another;
   a hitch system directly coupled to the support structure and comprising a pair of lift arms, each of the lift arms being pivotably coupled to a respective one of the supports of the support structure; and
   an anti-roll system comprising an anti-roll bar directly coupled to the support structure such that the support structure simultaneously supports both the hitch system and the anti-roll system, the anti-roll bar being disposed above both of the supports.

2. The hitch and anti-roll system of claim 1, wherein the hitch system further comprises a pair of rocker arms, each of the rocker arms being coupled to a respective one of the lift arms and a respective one of the supports.

3. The hitch and anti-roll system of claim 1, further comprising a bar disposed in a space between the supports and coupling the supports to one another.

4. The hitch and anti-roll system of claim 1, further comprising a pair of anti-roll brackets coupling the anti-roll bar to the support structure, each of the anti-roll brackets coupling to a respective one of the supports.

5. The hitch and anti-roll system of claim 1, wherein the hitch system is a three-point hitch system further comprising a top link movably coupled to the support structure.

6. The hitch and anti-roll system of claim 1, wherein the support structure is configured for mounting to a differential of the work vehicle.

7. A work vehicle, comprising:
   a chassis;
   a cab comprising a frame carried by the chassis;
   a support structure carried by the chassis, the support structure comprising a pair of spaced apart supports coupled to one another;
   a hitch system directly coupled to the support structure and comprising a pair of lift arms, each of the lift arms being pivotably coupled to a respective one of the supports of the support structure; and
   an anti-roll system comprising an anti-roll bar coupled to the frame of the cab and directly coupled to the support structure such that the support structure simultaneously supports both the hitch system and the anti-roll system, the anti-roll bar being disposed above both of the supports.

8. The work vehicle of claim 7, wherein the hitch system further comprises a pair of rocker arms, each of the rocker arms being coupled to a respective one of the lift arms and a respective one of the supports.

9. The work vehicle of claim 7, further comprising a bar disposed in a space between the supports and coupling the supports to one another.

10. The work vehicle of claim 7, further comprising a pair of anti-roll brackets coupling the anti-roll bar to the support structure, each of the anti-roll brackets coupling to a respective one of the supports.

11. The work vehicle of claim 7, wherein the hitch system is a three-point hitch system further comprising a top link movably coupled to the support structure.

12. The work vehicle of claim 7, further comprising a differential carried by the chassis, the support structure being mounted to the differential.

* * * * *